United States Patent [19]
Weinel

[11] 3,758,786
[45] Sept. 11, 1973

[54] APPARATUS FOR SETTING BOTH BEAMS OF AN OPTICAL TWO-BEAM INSTRUMENT TO EQUAL INTENSITY

[75] Inventor: Johann Weinel, Karlsruhe, Germany

[73] Assignee: Siemens Aktiengesellschaft, Munich, Germany

[22] Filed: Apr. 6, 1972

[21] Appl. No.: 241,787

[30] Foreign Application Priority Data
Apr. 6, 1971   Germany.................. P 21 16 849.0

[52] U.S. Cl.................. 250/343, 250/347, 350/166
[51] Int. Cl. ............................................. G01n 21/34
[58] Field of Search................ 250/43.5 R; 350/166

[56] References Cited
UNITED STATES PATENTS

2,754,424   7/1956   Woodhull et al. ................. 250/43.5
3,105,147   9/1963   Weilbach et al................... 250/43.5

*Primary Examiner* — William F. Lindquist
*Attorney* — Hugh A. Chapin

[57] ABSTRACT

In order to adjust the optical instrument to obtain equal beam intensities in each radiation channel, a part of the reflecting wall within one of the radiation channels or at the junction of the two radiation channels is replaced by a window and a surface which can be adjusted for variable reflectivity. The surface can be formed by a rotatable disc having a non-reflective half-face and a reflective half-face which, upon rotation, changes the reflection characteristics of the wall of at least one of the channels. The surface can also be formed by a strip having a wedge shaped non-reflective band thereon which strip is movable across the window in the wall of one channel.

12 Claims, 8 Drawing Figures

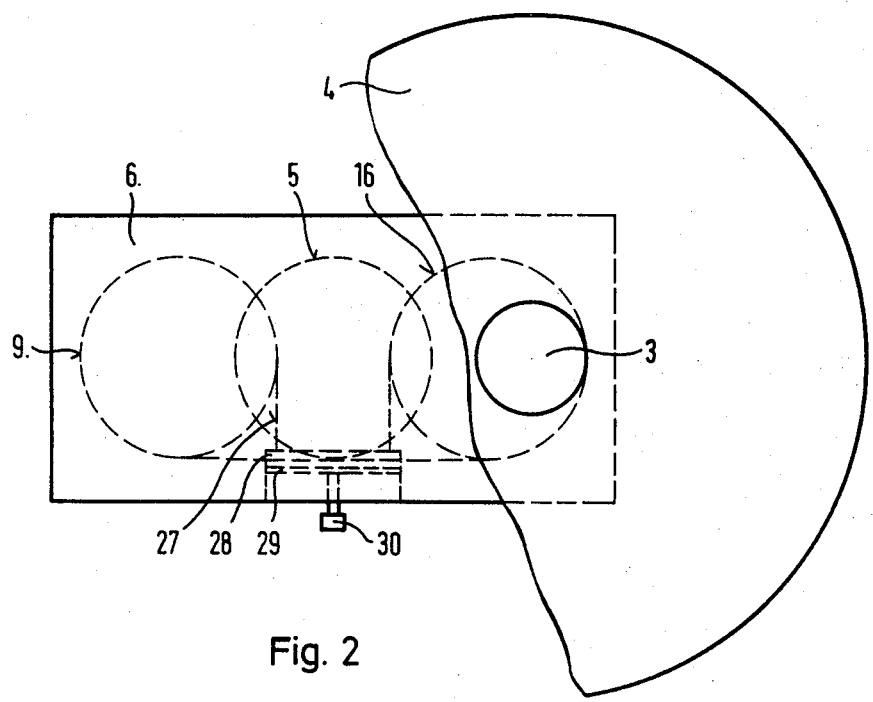
Fig. 2
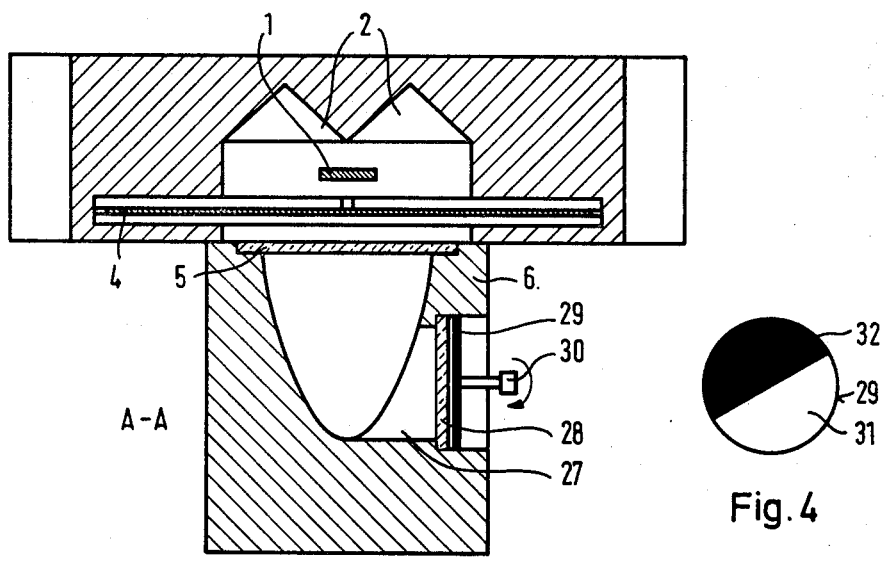
Fig. 3
Fig. 4

APPARATUS FOR SETTING BOTH BEAMS OF AN OPTICAL TWO-BEAM INSTRUMENT TO EQUAL INTENSITY

FIELD OF THE INVENTION

This invention relates to optical two-beam analyzing instruments and, particularly, to an apparatus for setting both beams of the instruments to equal intensity.

BACKGROUND OF THE INVENTION

Optical two-beam instruments have been known in which at least one of the beams has each been laterally contained, completely or partially, by means of a reflecting wall. In some cases, such a construction has been used for zero calibration, for example, of an infrared gas analyzing instrument wherein a first infrared beam passes into a measuring chamber and a second infrared beam passes into a comparison chamber.

Generally, in a number of optical two-beam instruments which have been used in the field of analysis technique, a solid, liquid or gaseous test specimen to be analyzed is exposed to a first beam while a standard specimen of like solid, liquid or gaseous form is exposed to a second beam (i.e., a reference beam) and the variable physical and/or chemical reciprocal action (e.g., absorption, transmission, reflection, chemical reaction) of both specimens has been measured with the incident bundle of rays (beam). The measured result for the test specimen has then been brought into relation with the comparison result for the standard specimen.

Other optical two-beam instruments have also been known in which the standard specimen has been missing so that the reciprocal action of the test specimen has been measured with just one beam. In such cases, the other beam serves for determining a comparison result.

Except for optical two-beam instruments which operate with extremely thin beams, both beams have been laterally enclosed, as a rule, by reflecting walls which provide for the transmission of the radiation. However, in all two beam instruments, the problem exists of ensuring an intensity of equal magnitude for both beams in order that the measured result may be brought into a defined relation with the comparison result.

In infrared gas-analyzing instruments where a first infrared beam incides into a measuring chamber filled with measuring gas and a second infrared beam incides into a comparison chamber filled with comparison gas, it has also been necessary to provide an equal magnitude for the total intensities measured above the cross-section of both beams prior to their entry into the chambers, in order to obtain an unmistakable zero point in the indication. Usually, a mask or masking diaphragm has been used for zero calibration which has been more or less pushed into one of both beams. However, the use of masks, especially in infrared gas analyzing instruments with a high resolution, entails disadvantages. For example, if a mask with a simple and cheap mechanical propulsion means is selected, neither a reproducible setting of the mask will be ensured nor will a precision adjustment be feasible. Masks with a more precise propulsion means can be used; however, such are very expensive. Further, in infrared gas-analyzing instruments with high resolution, the adjustable propulsion of a mask must be very slight in order that, for example 10 to 1 percent of the measuring range of the indicator might still be adjustable. The propulsion in such a case would be in the order of magnitude of a few micrometers. This means a particularly high requirement with respect to the precision of the mechanical propulsion instrument, with problems of temperature compensation already becoming apparent. Also, the required technical expenditure cannot be economically supported.

Accordingly, it is an object of the invention to provide an apparatus for setting both beams of an optical two-beam instrument to equal intensity.

It is another object of the invention to be able to effect slight resettings of the intensity of one or both beams of an infrared gas-analyzing instrument in a simple manner without entailing great mechanical expenditures.

SUMMARY OF THE INVENTION

Briefly, the invention provides a reflecting wall of at least one radiation channel of an optical two-beam instrument with a surface which can be adjusted to vary the reflectivity of the wall.

In one embodiment, an infrared gas analyzing instrument, wherein the radiation emitted by an infrared radiation source is split into two beams and transmitted through reflecting radiation channels into a measuring chamber and a comparison chamber, is provided with the adjustably variable reflectivity surface in the wall of one of the two radiation channels. This surface can also be positioned at any desired location of one of the two laterally enclosed radiation paths.

In another embodiment where an infrared gas analyzing instrument employs a beam splitter provided with reflecting channel surfaces, the surface of the adjustably variable reflectivity is placed in the wall of one of the two radiation channels of the beam splitter. In still another embodiment, where a beam splitter with two intersecting radiation channels is used, this surface is situated in the wall at the level of the point of intersection of both radiation channels. In this case, as the surface is adjusted to reduce the reflectivity in one channel the reflectivity in the other channel increases. Thus, the radiation reflectivity characteristics of the two channels change simultaneously.

Another feature of the invention that can be put into effect without great technical expenditure, particularly in infrared gas analyzing instruments, is that the reflecting channel wall is partially interrupted and provided at the interruption with a window that transmits the radiation while a body is arranged in movable relation behind the window with a surface turned toward the window. This surface of the body contains portions with variable reflective power. For example, the body is a metal body whose surface is partly polished clear to be reflective and partly badly reflecting (in the following called "black") to be non-reflective. Naturally, a body can be used that has a partially metallized surface, e.g., a gold layer, which is vapor deposited in places. This metal body or metallized body is rotatably mounted in the form of a disc behind the window. The body can also be constructed as an elongated metal band with a surface which is provided with a wedge-like black or clear strip and which is displaceably arranged behind the window. In any case, during a displacement, such as by rotation or shifting, a poorly reflecting surface portion of larger or smaller size is exposed to the radiation which impinges upon the metal body through the window so that a larger or smaller share of the impinging beam will be absorbed at the metal body's surface.

In order to carry out a precision adjustment of the movably arranged body with the variably reflecting surface, a reduction gear which is connected with a motor is provided.

In infrared gas analyzing instruments, a simple control of the function and of the reproducibility of the reading or indication is generally desired. To this end, a standard gas that contains a specific concentration of a component absorbed within the infrared spectral range, can be passed into a measuring chamber or into a comparison chamber. The measured quantity read from the indicator may then be compared with a datum value for readjusting the indicator, if necessary. This type of process, however, is usually very complicated and a standard gas is not always available. Therefore, in many instances, a standard gas has been simulated in the measuring chamber by slipping a diaphragm into the measuring channel. The indicator is then able to register the resultant loss of intensity as an absorption in the standard gas.

In accordance with the invention, in order to simulate a standard gas, two sector diaphragms are mounted in an opening of a laterally enclosed radiation path or, especially, in a radiation channel of the beam splitter. The first sector diaphragm has a surface possessing good reflectivity and the second diaphragm which is positioned behind or in front has a surface of similarly good reflectivity. In addition, the second diaphragm is rotatably mounted with respect to the first diaphragm so that depending on the position of the second sector diaphragm, a portion of the impinging infrared radiation can pass the diaphragm arrangement. Thus, just as the radiation share is absorbed in a standard gas, it is lost to detection in the indicator. The second sector diaphragm is arranged to be rotatable between two stops so as to move through a predetermined angle with rotation being effected by means of a moving magnet.

These and other objects and advantages of the invention will become more apparent from the following detailed description and appended claims taken in conjunction with the accompanying drawings in which:

DESCRIPTION OF THE DRAWINGS

FIG. 2 illustrates a plan view of the infrared gas analyzing instrument of FIG. 1;

FIG. 3 illustrates a view along line A—A of FIG. 1;

FIG. 4 illustrates a front view of a metal disc with partially blackened surface according to the invention;

DESCRIPTION OF THE PREFERRED EMBODIMENT

Figure 1:
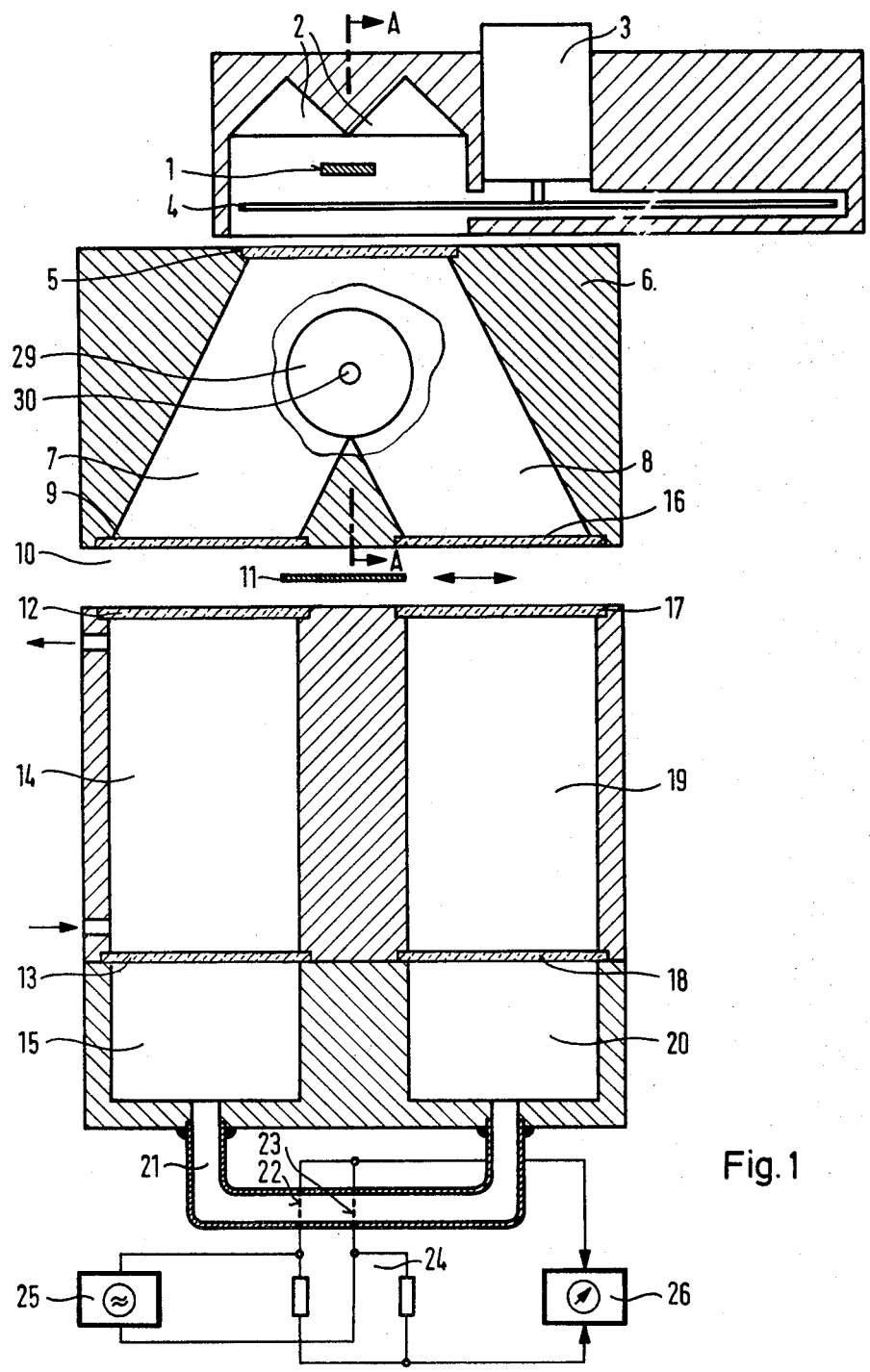
FIG. 1 illustrates a partial, bottom cross-sectional view of an infrared gas analysis instrument with a beam splitter and a partially blackened metal disc at the point of intersection of both radiation channels in accordance with the invention.

Referring to FIGS. 1, 2 and 3, an infrared gas-analyzing instruement is shown wherein the content of an analysis gas is determined in a gas mixture (measuring gas) by comparing the absorptive power of the gas mixture for infrared radiation with the absorptive power of a pure analysis gas or with a gas that has no absorptive power in the infrared radiation range.

Referring to FIG. 1, an infrared radiation source 1 is mounted in the analyzing instrument to emit radiation with a portion being reflected at a reflector 2. A motor 3 is mounted in the instrument to drive a cutting blade 4 so as to periodically interrupt the emitted radiation before the radiation reaches a window 5 mounted in a beam splitter 6. The beam splitter 6 comprises two divergent radiation channels 7 and 8 so that the radiation is split into a first infrared beam and a second infrared beam. The housing of the beam splitter 6 consists of metal, for example of aluminum, and the walls of the radiation channels 7 and 8 are carefully polished. A portion of the inciding (i.e., incident) radiation passes through the beam splitter 6 without reflection while another portion is transmitted under reflection to the polished walls of the channels 7, 8.

The infrared beam which is laterally enclosed by the first radiation channel 7 passes through a window 9 and travels across a narrow gap 10 wherein rests a masking diaphragm 11 that is movable in the direction indicated by the arrow. The masking diaphragm 11 is positioned to mask a portion of the first infrared beam and is adjustable so as to vary the amount masked. The beam subsequently passes through a window 12 into a measuring chamber 14 in which a gas mixture, to be investigated is passed. The beam then passes out of the chamber 14 through a window 13 to arrive in a first receiving chamber 15 that is filled with pure analysis gas or with a gas having a corresponding absorption power.

The second infrared beam which passes from the radiation channel 8 after passing through a window 16 in the beam splitter and the gap 10 passes into a closed comparison chamber 19 which has windows 17 and 18 on both sides and is filled with comparison gas. Thereafter, the second beam enters a second receptor chamber 20 which is filled with the same gas as the first receptor chamber 15.

As the share of analysis gas increases in the gas mixture under investigation which flows through the measuring chamber 14, less and less radiation power reaches the first receptor chamber 15 due to an increase in absorption. However, the same amount of radiation power still reaches the second receptor chamber 20. As a result, a variable heating of the gas in both receptor chambers 15 and 20 takes place which causes the occurrence of a periodic pressure difference which, in turn, produces a periodic flow in a connecting duct 21 which is connected in common between both receptor chambers 15, 20. In order to measure this flow, flow detectors in the form of two planar, thermo-sensitive gratings (grids) 22 and 23 are positioned in the connecting duct 21 at a distance from each other of less than one millimeter. The grids 22, 23 are connected into adjacent braches of a Wheatstone bridge 24 which is equalized when the current is missing. In addition, the grids 22, 23 are heated by means of an applied voltage source 25. The resistance change occurring as a result of the equalizing current serves as a measure for the current, for the absorption of the analysis gas in the measuring chamber 14 and finally, as a measure for the share of analysis gas in the gas mixture being investigated. This change in resistance is indicated and recorded in a recording instrument 26 connected as shown.

The displaceable mask 11 situated in the gap 10 serves only for a one-time symmetrization adjustment of the infrared gas-analyzing instrument. Also, for adjustment purposes, the measuring chamber 14 is rinsed with an infrared - inactive gas. Symmetry is attained when the infrared beams which incide into the measuring chamber 14 and into the comparison chamber 19 have the same total intensity. An exact adjustment, however, cannot be obtained due to the aforementioned lack of precision of the propulsion device for the mask 11 (not shown). Therefore, in order to achieve precision adjustment, a portion of the reflecting walls of the beam splitter 6 is replaced by a surface having an adjustably variable reflectivity. To this end, the beam splitter 6 is provided at the level of the point of intersection and perpendicularly to the axes of both intersecting radiation channels 7 and 8, with a bore 27 (FIGS. 2 and 3) which is closed by a window 28 that transmits infrared radiation and with a metal disc 29 behind the window 28. The metal disc 29 is mounted in the bore 27 for rotation by means of a led-out button 30.

Referring to FIG. 4, the surface of the metal disc 29 which is turned toward the window 28 comprises two surface portions with variable reflectivity, namely a reflective half 31 and a blackened non-reflective half 32.

Referring to FIGS. 2 and 3, the window 28 is positioned and sized so that a small amount of the infrared radiation enters and impinges upon the metal disc 29. During use, by turning the metal disc 29 by a small angle, slightly more radiation is reflected into one of the two radiation channels 7 and 8 and somewhat less radiation than before into the other one.

A rotation of the metal disc 29 by an angle of, e.g., 10° is equivalent to an advance of the mask 11 of a few micrometers with the exact value depending on the size of the window 28.

The zero calibration of the infrared gas analyzing instrument by adjusting the reflectivity of one or more reflecting walls has a fundamental advantage. That is, the mask 11 becomes superfluous, except in the infrared gas-analyzing instrument illustrated in FIGS. 1 to 3. Thus, the need for a gap 10, wherein gases may collect that can falsify the measuring result, can be eliminated. Further, by eliminating the mask 11, there is no possibility that the relative harmonic content of the periodically interrupted infrared radiation can change due to a shift in spatial position of the mask which change would otherwise affect the phase-relationship of both beams with respect to each other and cause a varying interference voltage. An omission of the gap 10 also eliminates the need for the two windows 12 and 17 of the measuring chamber 14 and comparison chamber 19. This saving on material provides, at the same time, a simplification in the production of the infrared gas-analyzing instrument.

Figure 5:
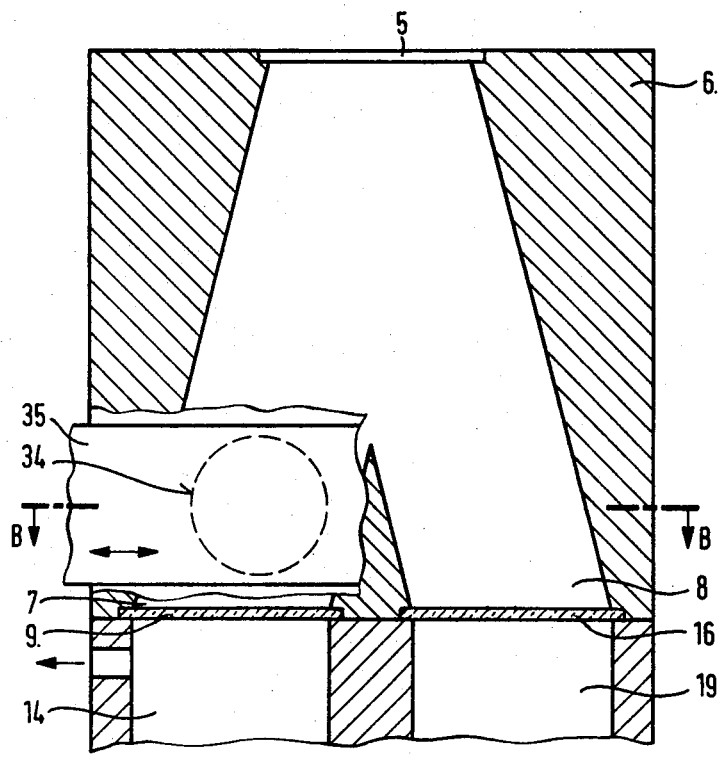
FIG. 5 illustrates a partial, bottom cross-sectional view of a beam splitter for an infrared gas-analyzing instrument with a displaceable metal band according to the invention.
Figure 6:
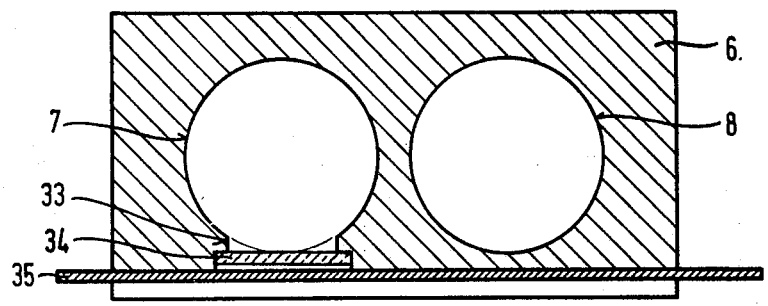
FIG. 6 illustrates a view taken on line B—B of FIG. 5.

Referring to FIGS. 5 and 6, wherein like reference characters indicate like parts as above, the infrared gas analyzing instrument includes a beam splitter 6 which is directly connected to a measuring chamber 14 and a comparison chamber 19. In this instrument, the radiation channel 7 of the beam splitter 6 includes a bore 33 in the reflecting channel wall that is situated perpendicularly to the channel axis. In addition, a window 34 is positioned in the wall across the bore 33. The window 34 is of a material to transmit infrared radiation and is situated in front of a body such as a metal band 35 which is movable in the direction of the double arrow across the width of the beam splitter 6.

Figure 7:
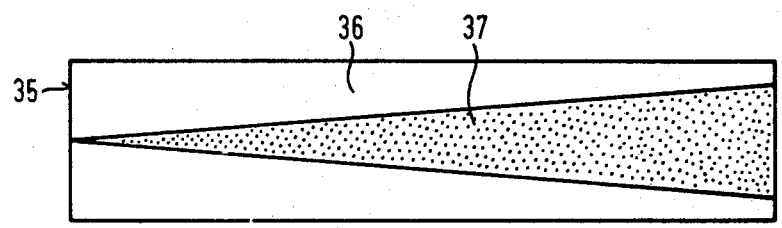
FIG. 7 illustrates a front view of the displaceable metal band of FIGS. 5 and 6.

Referring to FIG. 7, the metal band 35 has a surface which is turned toward the window 34 and which has a clean portion 36 and a wedge-shaped black strip 37.

As shown in FIG. 5, displacement of the metal band 35 across the window 34 causes the radiation which emerges through the window 34 to impinge upon a larger or smaller black face portion of the metal band 35 and a correspondingly greater or smaller amount of this radiation to be reflected back into the radiation channel 7. In contrast to the infrared gas-analyzing instrument described above in FIGS. 1 to 3, a displacement of the metal band 35 affects only one radiation channel 7.

Alternatively, a rotating metal body such as a disc (not shown) can also be arranged behind the window 34 on an axis of rotation offset from the axis of the bore 33. This disc can be constructed in a similar manner to the metal disc illustrated in FIG. 4.

Figure 8:
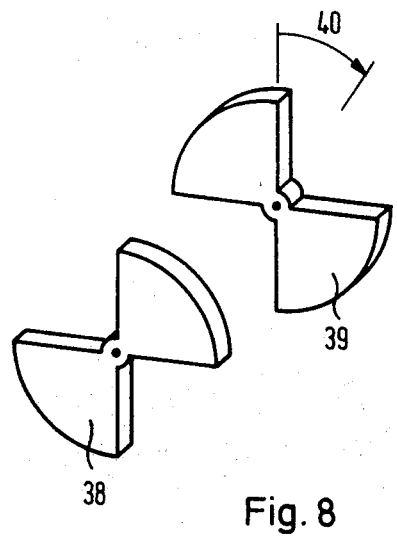
FIG. 8 illustrates an exploded view of two sector diaphragms which can be turned in opposition to each other according to the invention.

Referring to FIG. 8, two sector diaphragms 38 and 39 can be positioned in an infrared gas-analyzing instrument as above to simulate a standard gas in the measuring chamber. The first sector diaphragm 38 comprises two sectors with good reflectivity and is fixed in an opening placed into one of the two radiation channels of a beam splitter, e.g., in an opening in radiation channel 8 of the beam splitter 6 of FIG. 5, which opening corresponds to the bore 33. This opening can also be closed in the direction of the radiation channel with a window that transmits infrared radiation. A second sector diaphragm 39 is pivotally attached directly behind the first sector diaphragm 38 and also comprises two clean sectors. Both sector diaphragms 38 and 39 coincide and may obviously comprise more than two sectors. In the drawn position, the second sector diaphragm 39 is rotated by 90° with respect to the first sector diaphram 38, so that the passage for the impinging infrared radiation is blocked and almost completely reflected back into the radiation channel. When the second sector diaphragm 39 is rotated by a given angle, denoted 40 in FIG. 8, by means of a rotary magnet, for example, then a portion of the impinging infrared radiation can pass the laterally cleared parts of the diaphragm arrangement 38, 39. This portion of radiation is lost to the total intensity of the infrared radiation which emerges from the radiation channel. The intensity loss is detected in the indicator (reading) of the infrared gas analyzing instrument. Thus, a rotation of the second sector diaphragm 39, makes it possible to simulate a gas absorption in the measuring or comparison chamber provided for the respective radiation channel. The angle of rotation 40 around which the second sector diaphragm 39 is rotated constitutes a measure for the concentration of a component of a standard gas in this chamber that is being absorbed in the infrared spectral range. Hence, with the aid of a diaphragm arrangement 38, 39 illustrated in FIG. 8, the function of an infrared gas analyzing instrument and its reproducibility of indication can be examined from time to time, even without standard gas.

What is claimed is:

1. In a dual beam optical instrument including a radiation source disposed at one end of the instrument, a pair of radiation channels for passage of a respective beam through each, each channel having a radiation reflecting wall laterally enclosing at least a part thereof, a measuring chamber containing the gas to be analyzed to receive a beam from one of said channels, a comparison chamber containing a known gas to receive a beam from the other of said channels, and a pair of detectors at the opposite end of the instrument to detect radiation passing through said chambers, a planar surface of variable radiation reflectivity disposed in and comprising a portion of said radiation reflecting wall of at least one of said channels including a planar reflective portion for reflecting incident radiation, adjustment of said planar surface adjusting the amount of radiation reflected by the reflecting wall of each of said channels and the intensity of each beam therein.

2. The combination as set forth in claim 1 wherein said instrument is an infra-red gas analyzing instrument which includes a beam splitter including said radiation channels for splitting radiation from an infra-red radiation source into two beams for respective passage through said channels, said surface of variable reflectivity being disposed in said reflecting wall of both said channels, and including a non-reflective planar portion disposed adjacent said reflective portion for absorbing incident radiation, for adjusting the amount of radiation reflected by the reflecting wall of each of said channels and the intensity of said beams therein.

3. The combination as set forth in claim 1 wherein said instrument is an infra-red gas analyzing instrument which includes a beam splitter including said radiation channels and having reflecting channel surfaces for splitting radiation from an infra-red radiation source into two beams for respective passage through said channels, said surface of adjustable variable radiation reflectivity being disposed in the surface of one of said channels of said beam splitter and including a non-reflective planar portion disposed adjacent said reflective portion for absorbing incident radiation, for adjusting the amount of radiation reflected by the reflecting wall of said channel and the intensity of the beam passing therethrough.

4. The combination as set forth in claim 1 wherein said instrument is an infra-red gas analyzing instrument which includes a beam splitter including said radiation channels, said channels intersecting therein, for splitting radiation from the radiation source into two beams for respective passage through said channels, said surface of variable reflectivity being disposed in a plane of intersection of said radiation channels in said beam splitter and including a non-reflective planar portion disposed adjacent said reflective portion for absorbing incident radiation.

5. The combination as set forth in claim 1 wherein said wall of said one channel includes a window therein for transmission of radiation therethrough, said surface of variable reflectivity being disposed on an adjustably movable body in said wall behind said window and including a non-reflective planar portion disposed adjacent said reflective portion for absorbing incident radiation for adjusting the amount of radiation reflected by the reflecting wall of said channel and the intensity of the beam passing therethrough.

6. The combination as set forth in claim 5 wherein said body is metal and has said reflective and non-reflective portions of said surface disposed thereon.

7. The combination as set forth in claim 6 wherein said metal body is a disc rotatably mounted behind said window.

8. The combination as set forth in claim 6 wherein said metal body is a band and said non-reflective portion is wedge-shaped, said band being mounted so as to be displaceable behind said window.

9. The combination as set forth in claim 6 which further includes a motor having a reduction gear connected to said body for moving said body.

10. The combination as set forth in claim 1 wherein one of said walls of said channels includes a window therein for transmission of radiation therethrough and wherein said surface is disposed on a first sector diaphragm mounted in said wall behind said channel window, and a second sector diaphragm mounted adjacent to said first sector diaphragm, each of said diaphragms having said reflective surface portion disposed thereon and being movable relative to each other for adjusting the amount of radiation transmitted through said window and thereby varying the amount of radiation reflected by the reflecting wall of said channel.

11. The combination as set forth in claim 10 wherein said second sector diaphgram is rotatable through a predetermined angle relative to said first sector diaphragm and which further includes a pair of stops for limiting rotation of said second sector diaphragm.

12. The combination as set forth in claim 11 which further includes a rotating magnet for rotating said second sector diaphragm.

* * * * *